UNITED STATES PATENT OFFICE.

PAUL THOMASCHEWSKI, OF ELBERFELD, GERMANY, ASSIGNOR TO FARBENFABRIKEN OF ELBERFELD CO., OF NEW YORK, N. Y., A CORPORATION OF NEW YORK.

ANTHRAQUINONE DYE.

No. 801,418.      Specification of Letters Patent.      Patented Oct. 10, 1905.

Application filed June 10, 1905. Serial No. 264,698.

*To all whom it may concern:*

Be it known that I, PAUL THOMASCHEWSKI, doctor of philosophy, chemist, residing at Elberfeld, Germany, (assignor to the FARBENFABRIKEN OF ELBERFELD CO., of New York,) have invented a new and useful Improvement in Anthraquinone Dyes; and I hereby declare the following to be a clear and exact description of my invention.

My invention relates to the manufacture of a new dyestuff, being a hydroazin derivative of the anthracene series.

The process for producing this coloring-matter consists in heating the 1-oxy-3-bromo-4-amidoanthraquinone (obtainable by the action of bromin on paraämido-oxyanthraquinone) with cupric chlorid in the presence of a suitable dissolving or diluting agent and preferably with the addition of a product having a weak alkaline reaction, such as sodium acetate or the like. The reaction proceeds most probably according to the following equation:

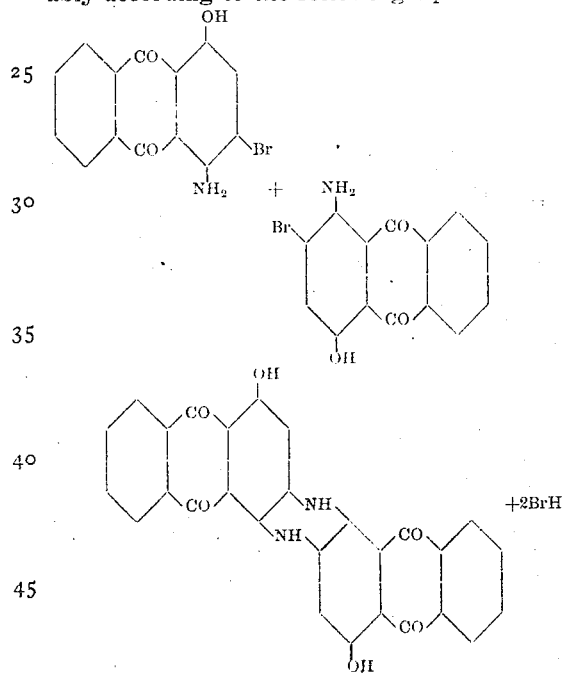

In carrying out the process practically I can proceed as follows, the parts being by weight: A mixture of ten parts of 1-oxy-3-bromo-4-amidoanthraquinone, one hundred parts of naphthalene, twelve parts of pulverized anhydrous sodium acetate, and one-fourth part of cupric chlorid ($CuCl_2$) is heated to boiling for about five hours while stirring. The crystalline precipitate thus obtained is filtered off, washed with alcohol and then with hot water.

My new coloring-matter thus obtained crystallizes from quinolin in the shape of blue needles having a cupreous luster. It is soluble in hot quinolin with a bluish-green color and soluble in concentrated sulfuric acid with an olive-green color. Upon treatment with hydrosulfite and caustic-soda lye it is transformed into its hydro compound, the blue alkaline solution of which has the properties of a "vat" suitable for dyeing and printing unmordanted cotton pure greenish-blue fast shades.

Having now described my invention and in what manner the same is to be performed, what I claim as new, and desire to secure by Letters Patent, is—

The herein-described new dyestuff being a hydroazin derivative of the anthracene series obtainable by heating 1-oxy-3-bromo-4-amidoanthraquinone with cupric chlorid and a suitable diluting agent, which dyestuff represents blue needles of a cupreous luster soluble in hot quinolin with a bluish-green and soluble in concentrated sulfuric acid with an olive-green color; being transformed into a hydro compound by suitable reduction with hydrosulfite and caustic-soda lye, the blue alkaline solution thus obtained exhibiting the typical properties of a "vat" which dyes unmordanted cotton pure greenish-blue shades, substantially as hereinbefore described.

In testimony whereof I have signed my name in the presence of two subscribing witnesses.

PAUL THOMASCHEWSKI.

Witnesses:
   OTTO KÖNIG,
   J. A. RITTERSHAUS.